United States Patent Office 3,053,868
Patented Sept. 11, 1962

3,053,868
PREPARATION OF HIGHER MOLECULAR WEIGHT COMPOUNDS
Louis Schmerling, Riverside, and Walter G. Toekelt, Downers Grove, Ill., assignors to Universal Oil Products Company, Des Plaines, Ill., a corporation of Delaware
No Drawing. Filed Nov. 16, 1959, Ser. No. 852,954
20 Claims. (Cl. 260—413)

This invention relates to a method for preparing organic compounds of relatively high molecular weight and particularly to a method of preparing relatively high molecular weight organic salts and acids.

More particularly the invention is concerned with the preparation of alkali metal salts of relatively high molecular weight unsaturated organic compounds and also the preparation of their corresponding acids.

Relatively high molecular weight unsaturated organic acids or the alkali metal salts thereof find many uses in the chemical field. For example, the higher molecular weight organic acids are used as intermediates in the preparation of esters which in turn are used in the preparation of artificial perfumes and flavors. Furthermore, certain esters may also be used as solvents, especially in the manufacture of quick drying paints and lacquers, while other esters may be used as lubricating oils. In addition the alkali metal salts of the higher molecular weight acids may be used in the preparation of soaps and cleansing agents.

It is therefore an object of this invention to provide a method for the preparation of alkali metal salts of higher molecular weight unsaturated organic acids.

A further object of this invention is to provide a method for the preparation of alkali metal salts of higher molecular weight unsaturated carboxylic acids and also a method of preparing the acids themselves.

One embodiment of this invention is found in a process for the preparation of a salt of an unsaturated organic acid which comprises reacting an olefinic hydrocarbon with a compound having the generic formula:

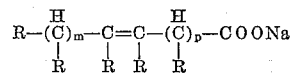

in which the R's are selected from the group consisting of hydrogen, alkyl and aryl radicals, m is an integer of from 0 to about 20, p is an integer of from 0 to about 25, at least one of m and p being greater than 0, and M is an alkali metal, at condensation conditions, in the presence of a catalyst selected from the group consisting of alkali metals, alkali metal hydrides, alkali metal amides, alkali metal alkyls and alkali metal aryls, and hydrolyzing the resultant product to form the desired salt of an unsaturated organic acid.

A further embodiment of this invention resides in a process for the preparation of a salt of an unsaturated organic acid which comprises reacting a monoolefinic alkene with a compound having the generic formula:

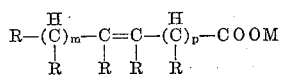

in which the R's are selected from the group consisting of hydrogen, alkyl and aryl radicals, m is an integer of from 0 to about 15, p is an integer of from 2 to about 15 and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and hydrolyzing the resultant product to form the desired salt of an unsaturated organic acid.

A specific embodiment of this invention is found in a process for the preparation of a sodium salt of an unsaturated organic acid which comprises reacting a monoolefinic alkene with a compound having the generic formula:

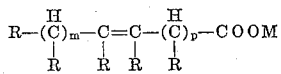

in which the R's are selected from the group consisting of hydrogen, alkyl and aryl radicals, m is an integer of from 0 to about 15 and p is an integer of from 2 to about 20, at a temperature in the range of from about 50° to about 300° C., in the presence of a catalyst selected from the group consisting of alkali metals, alkali metal hydrides, alkali metal amides, alkali metal alkyls and alkali metal aryls, hydrolyzing the resultant product to form the desired salt of an unsaturated organic acid.

A more specific embodiment of this invention resides in a process for the preparation of a salt of an unsaturated organic acid which comprises reacting ethylene with sodium oleate in the presence of sodamide, at a temperature in the range of from about 150° to about 250° C., and hydrolyzing the resultant product to form the desired sodium 2,2-diethyloleate.

Yet another embodiment of the invention resides in a process for the preparation of an unsaturated organic acid which comprises reacting an olefinic hydrocarbon with a compound having the generic formula:

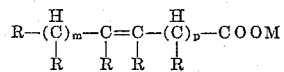

in which the R's are selected from the group consisting of hydrogen, alkyl and aryl radicals, m is an integer of from 0 to about 20, p is an integer of from 0 to about 25, at least one of m and p being greater than 0, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and hydrolyzing the resultant product to form the desired salt of an unsaturated organic acid, and thereafter acidifying said salt to form the desired unsaturated organic acid.

Yet another specific embodiment of the invention is found in a process for the preparation of an unsaturated organic acid which comprises reacting ethylene with sodium oleate in the presence of sodamide, at a temperature in the range of from about 150° to about 250° C., hydrolyzing the resultant product to form sodium 2,2-diethyloleate, and thereafter acidifying the last named compound to form the desired 2,2-diethyloleic acid.

Other objects and embodiments referring to alternative alkali metal salts of unsaturated organic acids, olefinic hydrocarbons, catalysts and diluents will be found in the following further detailed description of the invention.

As hereinbefore set forth this invention is concerned with the preparation of alkali metal salts of relatively high molecular weight unsaturated organic acids and also to the preparation of these acids themselves. These compounds are prepared by reacting an olefin with an alkali metal salt of an unsaturated organic acid, in the presence of certain catalysts hereinafter set forth. The olefins which may be used in the process of this invention include alkenes, cycloalkenes, alkadienes, cycloalkadienes and polyenes. The alkenes include straight and branched chain alkenes such as ethylene, propylene, 1-butene, 2-methylpropene, 1-pentene, 2-pentene, 2-methyl-1-butene, 1-hexene, 2-hexene, 3-hexene, 2-methyl-1-pentene, 3-methyl-1-pentene, 1-heptene, 2-heptene, 3-heptene, 2-methyl-1-hexene, 3-methyl-1-hexene, 2,3-dimethyl-1-hexene, the straight and branched chain 1-octenes, 1-nonenes, 1-decenes, etc. It is also contemplated within the scope of this invention that cyclic olefins such as cyclopentene, cyclohexene, cycloheptene, etc., and diolefins such as butadiene, isoprene, etc., may also be used although not necessarily with equivalent results. In general the preferred alkenes are the straight chain 1-alkenes of which ethylene is the preferred species.

The alkali metal salts of unsaturated organic acids which may be reacted with the olefinic compound hereinbefore set forth possess the generic formulae:

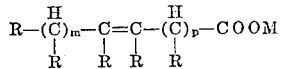

in which the R's are selected from the group consisting of hydrogen, alkyl radicals of up to five carbon atoms and aryl radicals of up to twelve carbon atoms, $m$ is an integer of from 0 to about 20, $p$ is an integer of from 0 to about 25, at least one of $m$ and $p$ being greater than 0, and M is an alkali metal. It is also contemplated within the scope of this invention that alkaline earth metal salts of unsaturated acids may also be used although not necessarily with equivalent results. These possess the generic formula:

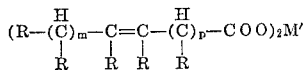

in which the R's, $m$ and $p$ have the above-defined meanings and M' is an alkaline earth metal. In the preferred embodiment of the invention the salts of acids in which there is at least one hydrogen atom on a carbon alpha to a carboxy group, such a carbon atom being referred to as an alpha carbon atom for purposes of this specification and in which $p$ is preferably at least 2, constitute the preferred salts, examples of such salts including sodium 3-ethylidenepropionate, potassium 3-ethylidenepropionate, lithium 3-ethylidenepropionate, cesium 3-ethylidenepropionate, rubidium 3-ethylidenepropionate, sodium allylacetate, potassium allylacetate, lithium allylacetate, cesium allylacetate, rubidium allylacetate, sodium hydrosorbate (that is, sodium 3-propylidenepropionate), potassium hydrosorbate, lithium hydrosorbate, cesium hydrosorbate, rubidium hydrosorbate, sodium pyroterebate (that is, sodium 3-isopropylidenepropionate), potassium pyroterebate, lithium pyroterebate, cesium pyroterebate, rubidium pyroterebate, sodium, potassium, lithium, rubidium and cesium teracrylates (3-butylidenepropionates), decylenates (3-decenoates) and isomers (4- to 9-decenoates), undecylenates (10-undecenoates), palmitoleates (9-hexadecenoates), oleates (9-octadecenoates), petroselinates (6-octadecenoates), vaccenates (11-octadecenoates), gadoleates (9-eicosenoates), cetoleates (11-docosenoates), erucates (13-docosenoates), selacholeates (15-tetracosenoates), etc. In addition, alkali metal salts of unsaturated organic acids in which $p$ in the above formulae is 0 to 1 such as sodium tiglate (sodium cis-2-methyl-2-butenoate), potassium tiglate, lithium tiglate, etc., sodium angelate (sodium trans-2-methyl-2-butenoate), potassium angelate, etc., sodium vinylacetate, sodium methacrylate, etc., may be reacted with the aforesaid monoolefinic alkenes, but not necessarily with equivalent results. Furthermore, it is also contemplated within the scope of this invention that the alkali metal salts of unsaturated organic compounds containing two or more double bonds such as, for example, sodium linoleate (sodium 9,12-octadecadienoate), potassium linoleate, etc., sodium linolenate (sodium 9,12,15-octadecatrienoate), potassium linolenate, etc., may also be used as starting materials in the process of the present invention.

Catalysts which are employed in the present process comprise the alkali metals, hydrides and amides thereof, such catalysts including sodium, sodium hydride, sodamide, potassium, potassium hydride, potassium amide, lithium, lithium hydride, lithium amide, rubidium hydride, rubidium amide, cesium, cesium hydride, cesium amide, etc. Mixed hydrides such as lithium aluminum hydride and sodium borohydride may also be used. The catalysts may also comprise an α-alkali metal derivative of an alkali metal salt of a carboxylic acid or a mixture of the derivative and one of the catalysts hereinbefore set forth. It is also contemplated within the scope of this invention that the alkali metal plus a promoter (such as an aromatic hydrocarbon including benzene, toluene, anthracene, etc., or an organic halide such as chlorobenzene, etc.) or the alkali metal alkyl or aryl such as pentylsodium, pentylpotassium, pentyllithium, phenylsodium, phenyllithium, phenylpotassium, etc., may be used as catalysts for the present invention although not necessarily with equivalent results.

In addition, if so desired, the reaction may be effected in the presence of a substantially inert organic diluent such as saturated aliphatic hydrocarbons including pentane, hexane, heptane, octane, etc.; cyclic and alkyl substituted cyclic hydrocarbons such as cyclopentane, cyclohexane, cycloheptane, etc., methylcyclopentane, methylcyclohexane, methylcycloheptane, etc.; aromatic hydrocarbons such as benzene, toluene, o-, m-, and p-xylene, ethylbenzene, etc., may also be used but are usually less preferable inasmuch as they may not be completely inert under the reaction conditions. Tertiary alkyl and aryl amines such as tributylamine and N,N-dimethylaniline may also be employed as diluents as may alkyl and polyalkyl ethers such as dibutyl ether, bis(ethoxyethyl)ether, etc.

Generally speaking the reaction between the alkali metal salt of a saturated carboxylic acid or the alkaline earth metal salt of an unsaturated organic acid, and an olefin, in the presence of a catalyst of the type hereinbefore set forth, is effected at a temperature in the range of from about 50° to about 300° C., and preferably at a temperature in the range of from about 150° to about 250° C., the particular temperature being dependent upon the reactants and the catalyst which are used. In addition the reaction will proceed at an elevated pressure, usually in the range of from about 25 to about 200 atmospheres or more. This pressure will generally be supplied by the olefin, if in gaseous form. However, it is also contemplated within the scope of this invention that the pressure may also be supplied by the addition of an inert gas. In each case, however, the pressure will be sufficient to maintain a substantial portion of the reactants in liquid form.

The process of this invention may be effected in any suitable manner and may comprise either a batch or a continuous type operation. For example, when a batch type operation is used a quantity of the alkali metal salt of an unsaturated organic acid along with the olefin if in liquid form, the diluent or solvent, if any is used, and the catalyst is sealed in a suitable apparatus such as, for example, a rotating autoclave. If the olefin is in gaseous form, it is pressed in, until the desired pressure has been reached, after which the autoclave is sealed. The reaction vessel is heated to the desired temperature and maintained thereat for a predetermined period of time after which the autoclave and contents thereof are cooled to room temperature, the excess pressure is vented and the reaction product is recovered by conventional means such as, for example, by dissolving the reaction product in water thereby forming a solution of the desired salt of a higher molecular weight organic acid. The aqueous solution may then be extracted with a suitable organic solvent such as ether to separate the diluent and to remove traces of alkali-insoluble material after which the aqueous solution is concentrated and the desired salt is separated by fractional crystallization. If, as is usually the case, the higher weight molecular acid itself is desired, the aqueous solution is acidified by conventional means using acidifying agent such as inorganic acids including hydrochloric acid, sulfuric acid, nitric acid, etc., and recovered by crystallization, one method consisting of extraction of the acid with a solvent such as ethyl ether, followed by fractionation of the extract.

The reaction process of the present invention may also be effected in a continuous type manner. In this type of operation the starting materials comprising the alkali metal salt of an unsaturated organic acid and the olefin are continuously charged to a reaction zone which is maintained at the proper operating conditions of temperature and pressure and which contains the desired catalyst such as the alkali metal or amide or hydride thereof. The salt of the unsaturated organic acid and the olefin, in either liquid or gaseous form, are charged to the reactor through separate lines or, if so desired, may be admixed prior to entry into said reactor and charged thereto in a single stream. Likewise, the solvent or diluent, if one is used, is also continuously charged to the reactor through separate means or, may be admixed with one or the other of the starting materials and charged thereto in a single stream. The reaction zone may comprise an unpacked vessel or coil or may be lined with an adsorbent packing material such as alumina, dehydrated bauxite, fire brick and the like. After a predetermined residence time has elapsed the reaction product is continuously withdrawn from the reactor and separated from diluent and unreacted olefin by conventional means. The unreacted starting materials are recycled to form a portion of the feed stock while the reaction product is then continuously charged to a second reaction zone where said product is treated with water which is also being continuously charged to said second reactor. The resulting product is then continuously withdrawn from the second reaction zone and the desired salt of the higher molecular weight organic acid is then separated by conventional means and recovered. If the higher molecular weight organic acid itself is desired, the aforesaid product from the second reaction zone is then continuously charged to yet a third reaction zone where it is acidified by the addition of an acid of the type hereinbefore set forth. The product is continuously withdrawn from this third reaction zone and the higher molecular weight organic acid is recovered by conventional means, such as, for example, fractional distillation, fractional crystallization, etc. Alternatively, the hydrolysis and acidification can be carried out simultaneously in the second zone.

The following examples are given to illustrate the process of the present invention, which, however, are not intended to limit the generally broad scope of the present invention in strict accordance therewith.

*Example I*

A mixture of 30 g. of sodium oleate and 10 g. of sodamide was placed in a glass liner of a rotating autoclave having a capacity of 850 cc. The liner was sealed into the autoclave and ethylene pressed in until an initial pressure of 50 atmospheres had been reached. The autoclave and contents thereof were then slowly heated to a temperature of about 250° C. during a period of about 4 hours. During this time the maximum pressure in the autoclave rose to 143 atmospheres. At the end of the aforementioned period of time the autoclave and contents thereof were cooled to room temperature, the excess pressure was vented, the autoclave was opened and 44 g. of grayish tan greasy solid product was recovered. The product was treated with water and extracted with ether to remove the alkali-insoluble material present. The aqueous solution consisted of a mixture of dissolved unreacted sodium oleate, sodium 2-ethyloleate and sodium 2,2-diethyloleate which may be recovered by fractional crystallization. Preferably, however, the aqueous solution was acidified using dilute hydrochloric acid as the acidifying agent. The thus liberated acids were extracted with ether and the ether extract was subjected to fractional distillation under reduced pressure. The cut boiling at 200–201° C. at 1.1 mm. pressure, comprising 15 g. of 2,2-diethyloleic acid was separated therefrom. The neutral equivalent of this material was found to be 3.00 milliequivalents per gram, which is equivalent to a molecular weight of 333.33; the molecular weight which is calculated for diethyloleic acid is 338.56. This material was subjected to analysis with the following results. Found: C, 78.00; H, 12.63. Calcd. for: $C_{22}H_{42}O_2$: C, 78.04; H, 12.50.

*Example II*

A mixture of 30 g. of potassium oleate and 10 g. of potassium amide is placed in a glass liner of a rotating autoclave similar to that described in Example I above. The liner is sealed into the autoclave and ethylene pressed in until an initial pressure of 50 atmospheres is reached. The autoclave is slowly heated to a maximum temperature of 250° C. during a period of 4 hours. At the end of the residence time the autoclave and contents thereof are allowed to cool to room temperature, the excess pressure is vented, the autoclave is opened and the reaction product is recovered therefrom. The product is treated with water and extracted with ether following which, if so desired, the unreacted potassium oleate, potassium 2-ethyloleate and potassium 2,2-diethyloleate may be separated and recovered by fractional crystallization. Preferably, however, the salts are acidified using a dilute mineral acid such as hydrochloric acid as the acidifying agent. The acids are then extracted with ether and the ether extract is subjected to fractional distillation under reduced pressure, the 2-ethyloleic acid and 2,2-diethyloleic acid being separated and recovered.

*Example III*

In this example a mixture of 30 g. of sodium oleate and 10 g. of sodamide is placed in a glass liner of a rotating autoclave. The liner is sealed into the autoclave and propylene pressed in until an initial pressure of 50 atmospheres is reached. The autoclave and contents thereof are then slowly heated to a maximum temperature of 250° C. during a period of 4 hours, the maximum pressure during this residence time rising to a value substantially greater than said initial pressure. At the end of the aforesaid residence time the autoclave and contents thereof are cooled to room temperature, the excess pressure is vented and the reaction product is recovered. The reaction product is dissolved in water and then extracted with ether to remove any water-insoluble material which may be present. The unreacted sodium oleate 2-isopropyloleate and 2,2-diisopropyloleate may be recovered by fractional crystallization. However, if the corresponding acids thereof are desired the treated product is acidified using a dilute mineral acid such as hydrochloric acid as the acidifying agent. The thus liberated acids are extracted with ether and the ether extract subjected to fractional distillation under reduced pressure, the desired 2-isopropyloleic acid and 2,2-diisopropyloleic acid being separated and recovered therefrom.

*Example IV*

A mixture of 30 g. of sodium hydrosorbate and 10 g. of sodamide are treated in a manner similar to that set forth in Examples I and II above, that is, placed in the glass liner of a rotating autoclave, the liner is sealed into the autoclave, ethylene pressed in until an initial pressure of 50 atmospheres has been reached. The autoclave is then slowly heated to a maximum temperature of 250° C. for a period of about 4 hours following which the autoclave and contents thereof are allowed to cool to room temperature, the excess pressure is vented and the reaction product is recovered from the liner. The product is treated with water and extracted with ether to remove any alkali-insoluble product. Sodium 2-ethyl-3-hexenoate and sodium 2,2-diethyl-3-hexenoate may be recovered by fractional crystallization or, if so desired,

We claim as our invention:

1. A process for the preparation of a salt of an unsaturated organic acid which comprises reacting an olefinic hydrocarbon with a compound having the generic formula:

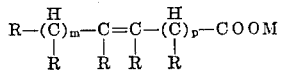

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at condensation conditions, in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the olefinic hydrocarbon being reacted in sufficient amount to form a salt of an unsaturated organic acid in which at least one alpha hydrogen atom shown in the above formula is replaced by an alkyl group corresponding to the olefinic hydrocarbon.

2. A process for the preparation of a salt of an unsaturated organic acid which comprises reacting an olefinic hydrocarbon with a compound having the generic formula:

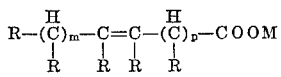

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the olefinic hydrocarbon being reacted in sufficient amount to form a salt of an unsaturated organic acid in which at least one alpha hydrogen atom shown in the above formula is replaced by an alkyl group corresponding to the olefinic hydrocarbon.

3. A process for the preparation of a salt of an unsaturated organic acid which comprises reacting a 1-alkene with a compound having the generic formula:

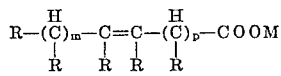

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

4. A process for the preparation of a salt of an unsaturated organic acid which comprises reacting ethylene with a compound having the generic formula:

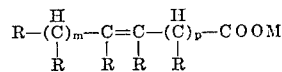

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the ethylene being reacted in sufficient amount to form a salt of an unsaturated organic acid in which at least one alpha hydrogen atom shown in the above formula is replaced by ethyl.

5. A process for the preparation of a salt of an unsaturated organic acid which comprises reacting propylene with a compound having the generic formula:

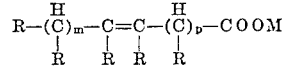

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the propylene being reacted in sufficient amount to form a salt of an unsaturated organic acid in which at least one alpha hydrogen atom shown in the above formula is replaced by propyl.

6. A process for the preparation of a sodium salt of an unsaturated organic acid which comprises reacting a 1-alkene with a compound having the generic formula:

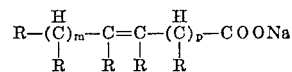

in which the R's are selected from the group consisting of hydrogen, alkyl and aryl radicals, $m$ is an integer of from 0 to about 20 and $p$ is an integer of from 0 to about 25, at least one of $m$ and $p$ being greater than 0, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

7. A process for the preparation of a potassium salt of an unsaturated organic acid which comprises reacting a 1-alkene with a compound having the generic formula:

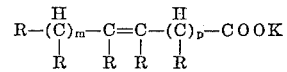

in which the R's are selected from the group consisting of hydrogen, alkyl and aryl radicals, $m$ is an integer of from 0 to about 20 and $p$ is an integer of from 0 to about 25, at least one of $m$ and $p$ being greater than 0, at a temperature in the range of from about 50° to about 300° C., in the presence of a catalyst selected from the group consistin of alkali metals, alkali metal hydrides, alkali metal amides, alkali metal alkyls and alkali metal aryls, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

8. A process for the preparation of a lithium salt of an unsaturated organic acid which comprises reacting a 1-alkene with a compound having the generic formula:

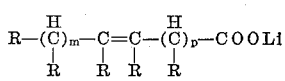

in which the R's are selected from the group consisting of hydrogen, alkyl and aryl radicals, $m$ is an integer of from 0 to about 20 and $p$ is an integer of from 0 to about 25, at least one of $m$ and $p$ being greater than 0, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

9. A process for the preparation of a salt of an unsaturated organic acid which comprises reacting a 1-alkene with a compound having the generic formula:

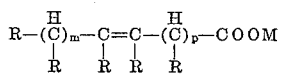

in which the R's are selected from the group consisting of hydrogen, alkyl and aryl radicals, $m$ is an integer of from 0 to about 15 and $p$ is an integer of from 2 to about 15, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

10. A process for the preparation of a salt of an unsaturated organic acid which comprises reacting ethylene with a compound having the generic formula:

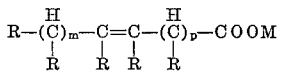

in which the R's are selected from the group consisting of hydrogen, alkyl and aryl radicals, $m$ is an integer of from 0 to about 15 and $p$ is an integer of from 2 to about 15, M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, and treating the resultant product with water to form an aqueous solution of the desired salt of an unsaturated organic acid, the ethylene being reacted in sufficient amount to form a salt of an unsaturated organic acid in which at least one alpha hydrogen atom shown in the above formula is replaced by ethyl.

11. A process for the preparation of a salt of an unsaturated organic acid which comprises reacting a 1-alkene with a compound having the generic formula:

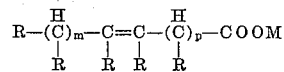

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst comprising sodium, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

12. A process for the preparation of a salt of an unsaturated organic acid which comprises reacting a 1-alkene with a compound having the generic formula:

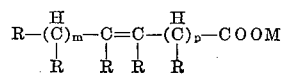

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst comprising sodamide, and treating the resultant product with water to form an aqueous solution of the desired salt of an unsaturated organic acid, the 1-alkene being reacted in sufficient amount to form a salt of an unsaturated organic acid in which at least one alpha hydrogen atom shown in the above formula is replaced by an alkyl group corresponding to the 1-alkene.

13. A process for the preparation of a salt of an unsaturated organic acid which comprises reacting ethylene with sodium oleate in the presence of sodamide at a temperature in the range of from about 150° to about 250° C., and treating the resultant product with a water to form an aqueous solution of the desired sodium 2,2-diethyloleate, the ethylene being reacted in sufficient amount to form the last-mentioned compound.

14. A process for the preparation of a salt of an unsaturated organic acid which comprises reacting ethylene with potassium oleate in the presence of potassamide at a temperature in the range of from about 150° to about 250° C., and treating the resultant product with water to form an aqueous solution of the desired potassium 2,2-diethyloleate, the ethylene being reacted in sufficient amount to form the last-mentioned compound.

15. A process for the preparation of a sodium salt of an unsaturated organic acid which comprises reacting propylene with sodium oleate in the presence of sodamide at a temperature in the range of from about 150° to about 250° C., and treating the resultant product with water to form an aqueous solution of the desired sodium 2,2-dipropyloleate, the propylene being reacted in sufficient amount to form the last-mentioned compound..

16. A process for the preparation of a sodium salt of an unsaturated organic acid which comprises reacting ethylene with sodium hydrosorbate in the presence of sodamide at a temperature in the range of from about 150° to about 250° C., and treating the resultant product with water to form an aqueous solution of the desired sodium 2,2-diethylhydrosorbate, the ethylene being reacted in sufficient amount to form the last-mentioned compound.

17. A process for the preparation of an unsaturated organic acid which comprises reacting an olefinic hydrocarbon with a compound having the generic formula:

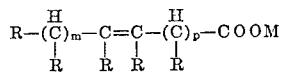

in which the R's are selected from the group consisting of hydrogen, alkyl and aryl radicals, $m$ is an integer of from 0 to about 20, $p$ is an integer of from 0 to about 25, at least one of $m$ and $p$ being greater than 0, and M is an alkali metal, at a temperature in the range of from about 50° to about 300° C., in the presence of a catalyst selected from the group consisting of alkali metals, alkali metal hydrides, alkali metal amides, alkali metal alkyls and alkali metal aryls, treating the resultant product with water to form an aqueous solution of the desired salt of an unsaturated organic acid, and thereafter acidifying said solution to form the desired unsaturated organic acid, the olefinic hydrocarbon being reacted in sufficient amount to form a salt of an unsaturated organic acid in which at least one alpha hydrogen atom shown in the above formula is replaced by an alkyl group corresponding to the olefinic hydrocarbon.

18. A process for the preparation of an unsaturated organic acid which comprises reacting ethylene with sodium oleate in the presence of sodamide at a temperature in the range of from about 150° to about 250° C., treating the resultant product with water to form an aqueous solution of sodium 2,2-diethyloleate, the ethylene being reacted in sufficient amount to form the last-mentioned compound, and thereafter acidifying said solution to form the desired 2,2-diethyloleic acid.

19. A process for the preparation of an unsaturated organic acid which comprises reacting propylene with sodium oleate at a temperature in the range of from about 150° to about 250° C., treating the resultant product with water to form an aqueous solution of sodium 2,2-diisopropyloleate, the propylene being reacted in sufficient amount to form the last-mentioned compound, and thereafter acidifying the solution to form the desired 2,2-diisopropyloleic acid.

20. A process for the preparation of an unsaturated organic acid which comprises reacting ethylene with sodium hydrosorbate in the presence of sodamide at a temperature in the range of from about 150° to about 250° C., treating the resultant product with water to form an aqueous solution of sodium 2,2-diethyl-3-hexenoate, the ethylene being reacted in sufficient amount to form the last-mentioned compound, and thereafter acidifying the solution to form the desired 2,2-diethyl-3-hexenoic acid.

References Cited in the file of this patent
UNITED STATES PATENTS

| | | |
|---|---|---|
| 2,297,039 | Van Melsen | Sept. 29, 1942 |
| 2,561,791 | Elwell et al. | July 24, 1951 |